(12) United States Patent
Wen

(10) Patent No.: US 6,412,840 B1
(45) Date of Patent: Jul. 2, 2002

(54) GARBAGE PICKUP TOOL

(76) Inventor: Wung Chin Wen, PO Box 82-144, Taipei (TW)

( * ) Notice: Subject to any disclaimer, the term of this patent is extended or adjusted under 35 U.S.C. 154(b) by 25 days.

(21) Appl. No.: 09/755,066

(22) Filed: Jan. 8, 2001

(51) Int. Cl.$^7$ .............................................. A01D 11/06

(52) U.S. Cl. ............................ 294/24; 294/61; 294/104

(58) Field of Search ........................... 294/19.1, 22, 23, 294/24, 61, 50.9, 104, 115

(56) References Cited

U.S. PATENT DOCUMENTS

| | | | | |
|---|---|---|---|---|
| 2,989,334 A | * | 6/1961 | Browne | 294/61 |
| 3,526,424 A | * | 9/1970 | Torres | 294/24 |
| 4,655,495 A | * | 4/1987 | Naff, Jr. | 294/61 |
| 4,699,411 A | * | 10/1987 | Scott | 294/50.9 |
| 5,370,433 A | * | 12/1994 | Yost | 294/61 |

* cited by examiner

Primary Examiner—Dean J. Kramer
(74) Attorney, Agent, or Firm—A & J

(57) ABSTRACT

A garbage pickup tool includes a handle having a threaded tubular neck and a circular groove, a C-shaped retainer ring fitted within the circular groove, a tubular shaft having an end inserted into the handle, a cable having two ends provided with two nipples, a trigger mounted within the handle, a collar threadedly engaged with the threaded tubular neck, a stationary jaw fixedly mounted on another end of the tubular shaft and having an intermediate portion formed with a recess, an end of the movable jaw being fitted within the recess, a movable jaw having an end fitted within the recess, a top of the movable jaw being formed with a second groove in which is fitted a head having a groove, a needle rod extending from an end of the head and being able to be kept at two different positions by a spring, and a link having an end pivotally connected with the movable jaw and another end pivotally connected with a slider which is sleeved over the needle rod, whereby various kinds of garbage can be easily picked up the garbage pickup clamp.

1 Claim, 6 Drawing Sheets

GARBAGE PICKUP TOOL

BACKGROUND OF THE INVENTION

1. Field of the Invention

This invention is related to a garbage pickup tool and in particular to one which can be used for picking up various kinds of garbage.

2. Description of the Prior Art

Generally, it is necessary to bend down to pick up garbage on the ground, causing possible injury or fatigue. Hence, a long tool with a clamping mechanism at the lower end has been developed to obviate this drawback However, such a kind of garbage collecting device cannot pick up garbage when it is in grass or plant beds. Therefore, it is an object of the present invention to provide a tool which can easily pick up leaves, plant refuse and the like when in grass or plant beds.

SUMMARY OF THE INVENTION

This invention is related to an improvement in the structure of a garbage pickup tool.

It is the primary object of the present invention to provide a garbage pickup tool which can be used for picking up various kinds of garbage.

It is another object of the present invention to provide a garbage pickup tool which can collect garbage by piercing it onto a needle rod and then removing it from the rod by a pushing mechanism.

It is a further object of the present invention to provide a garbage pickup tool having a handle which can be adjusted with respect to the pickup jaws.

According to the present invention, a garbage pickup tool includes a handle having a threaded tubular neck and a circular groove, a C-shaped retainer ring fitted within the circular groove, a tubular shaft having an end inserted into the handle, a cable having two ends provided with two nipples, a trigger mounted within the handle, a collar threadedly engaged with the threaded tubular neck, a stationary jaw fixedly mounted on another end of the tubular shaft and having an intermediate portion formed with a recess, an end of said movable jaw being fitted within the recess, a movable jaw having an end fitted within the recess, a top of the movable jaw being formed with a second groove in which is fitted a head having a groove, a needle rod extending from an end of the head and being able to be kept at two different positions by a spring, and a link having an end pivotally connected with the movable jaw and another end pivotally connected with a slider which is sleeved over the needle rod.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PRESENT INVENTION

Figure 1:
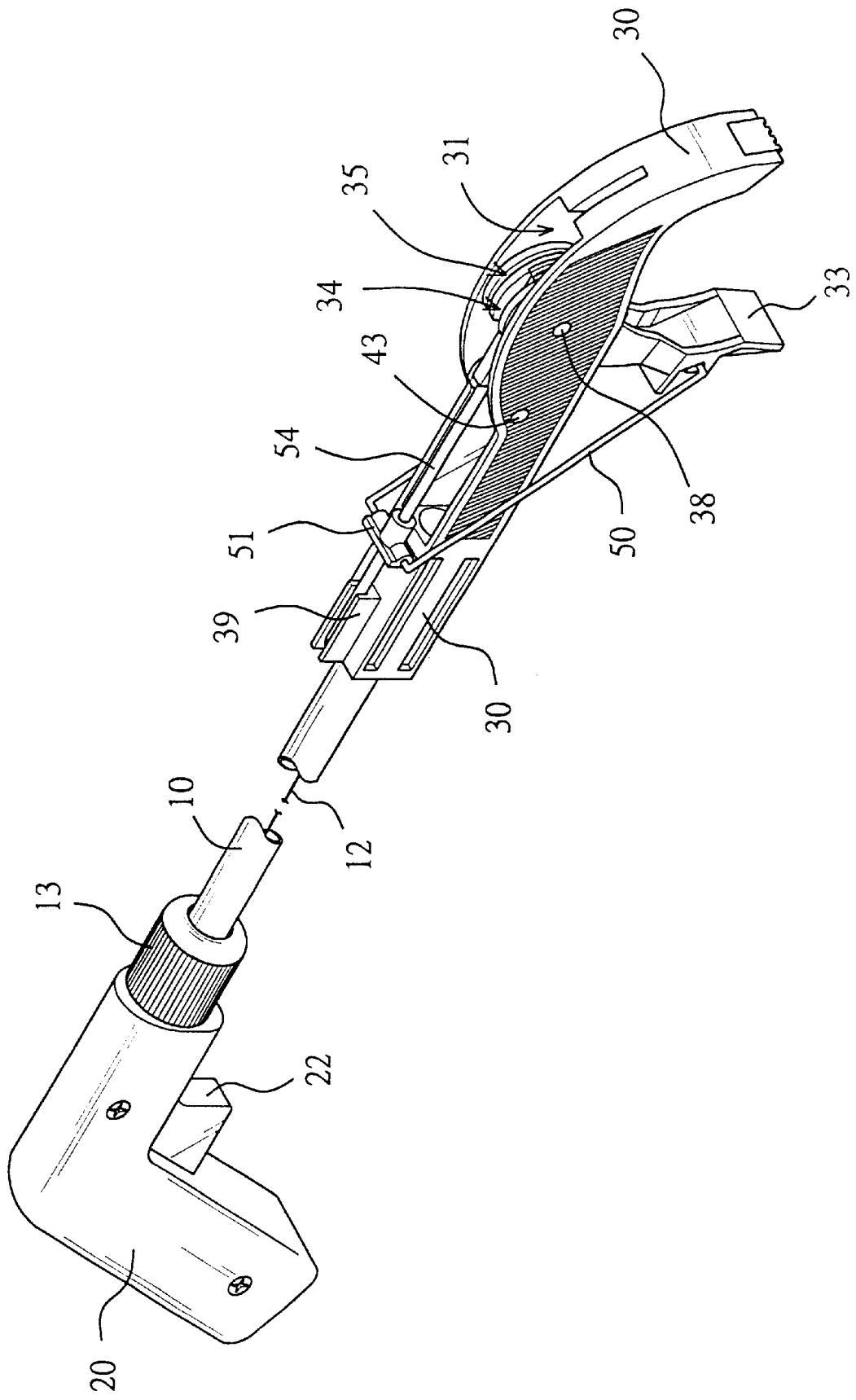
FIG. 1 is a perspective view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
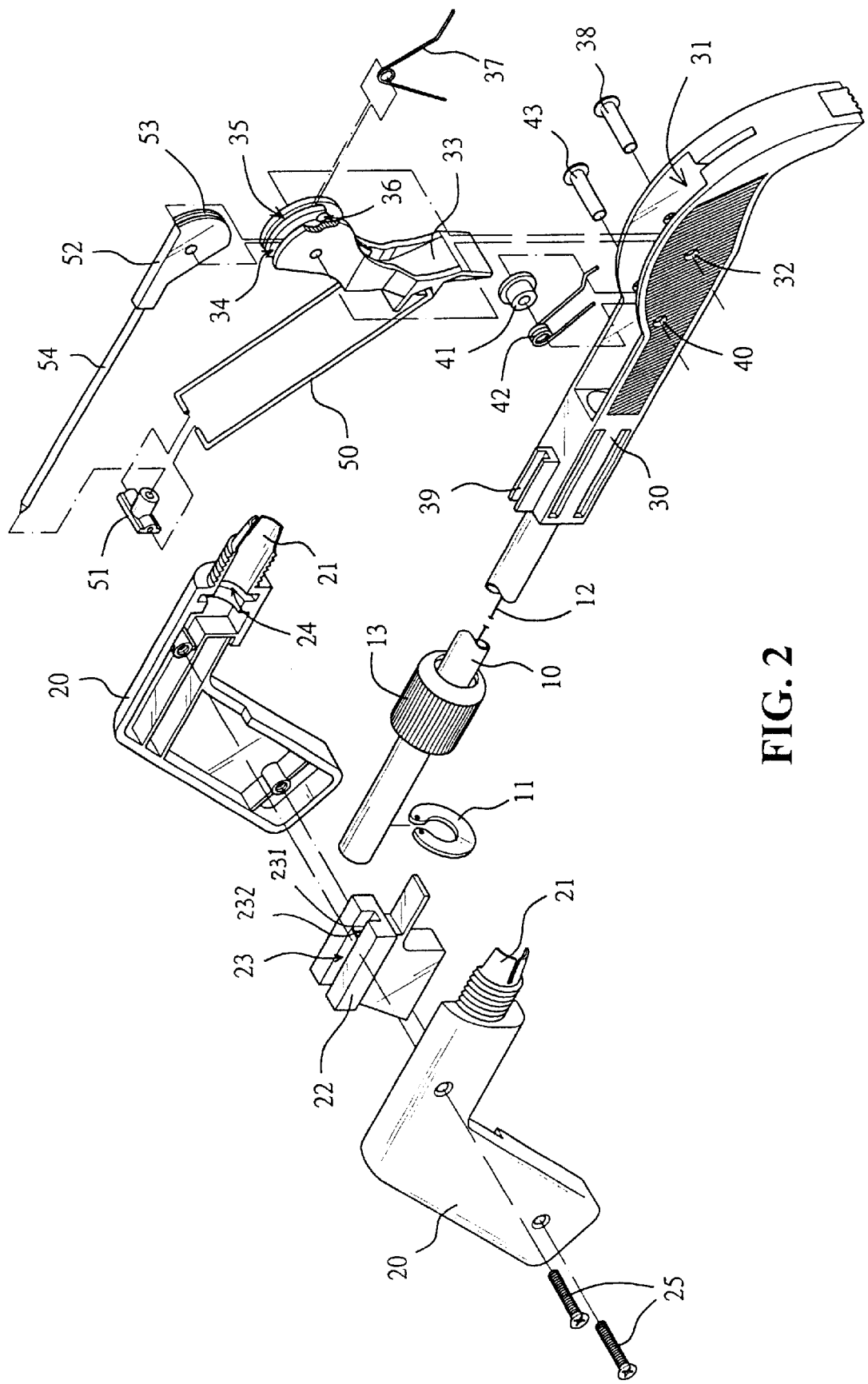
FIG. 2 is an exploded view of the present invention.

With reference to the drawings and in particular to FIGS. 1 and 2 thereof, the garbage pickup tool according to the present invention generally comprises a handle 20 and a clamping device provided at an end of the handle 20. A trigger 22 is mounted within the handle 20, which is formed with a longitudinal groove 23 at the top. The longitudinal groove 23 is provided with a stop member 231 having a notch 232 at the top for retaining a nipple of a cable 12 (see FIG. 3). The handle 20 is provided with a threaded tubular neck 21 through which a tubular shaft 10 is inserted into the handle 20. The handle 20 is formed with a circular groove 24 in the interior of the handle in which is fitted a C-shaped retainer ring 11. A collar 13 is threadedly engaged with the threaded tubular neck 21 of the handle 20.

The clamping device is composed of a stationary jaw 30 and a movable jaw 33. The stationary jaw 30 is fixedly mounted on an outer end of the tubular shaft 10 and formed at the intermediate portion with a recess 31. Two opposite lateral side walls of the intermediate portion of the stationary jaw 30 are each formed with two through holes 40 and 32 in communication with the recess 31. An end of the movable jaw 33 is fitted within the recess 31 of the stationary jaw 30. Two pins 43 and 38 extending through the through holes 40 and 32 of the stationary jaw 30 to keep the movable jaw 33, a sleeve 41, and two springs 37 and 42 within the recess 31, so that the spring 37 bears against the movable jaw 33 at an end and pushes against the stationary jaw 30 at the other. The movable jaw 33 is formed at the top with a groove 35 for receiving the cable 12 and has a positioning hole 36 for receiving another nipple of the cable 12.

The top of the movable jaw 33 is formed with a second groove 34 in which is fitted a head 52 having a groove 53. The head 52 is pivotally connected with the movable jaw 33 by the pin 38. A needle rod 54 extends from an end of the head 52 so that the needle rod 54 may be turned to engage with a seat 39 on the stationary jaw 30 or dispose on the other side of the stationary jaw 30 (see FIG. 5). The spring 42 bears the groove 53 of the head 52 at an end and pushes the bottom of the stationary jaw 30 at the other so that the needle rod 54 can be kept at two different positions (see FIGS. 5 and 6). A link 50 is pivotally connected with the movable jaw 33 at an end and pivotally connected with a slider 51 at the other. The slider 51 is sleeved over the needle rod 54.

Figure 3:
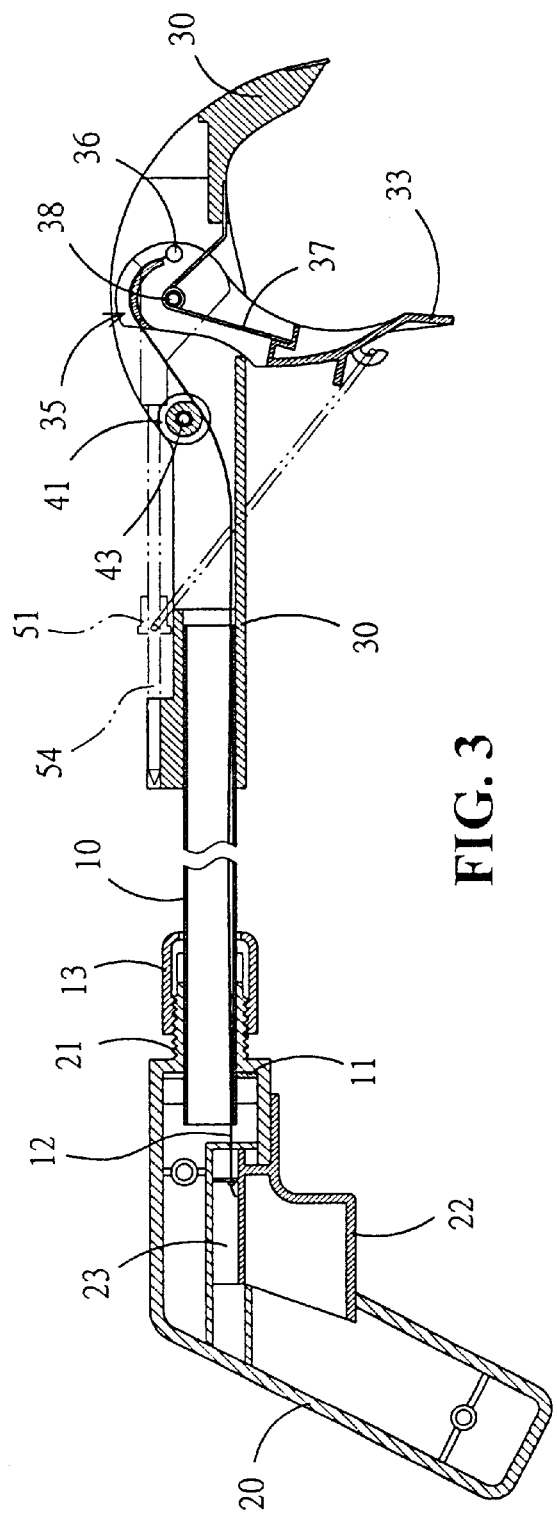
FIG. 3 is a sectional view of the present invention.
Figure 4:
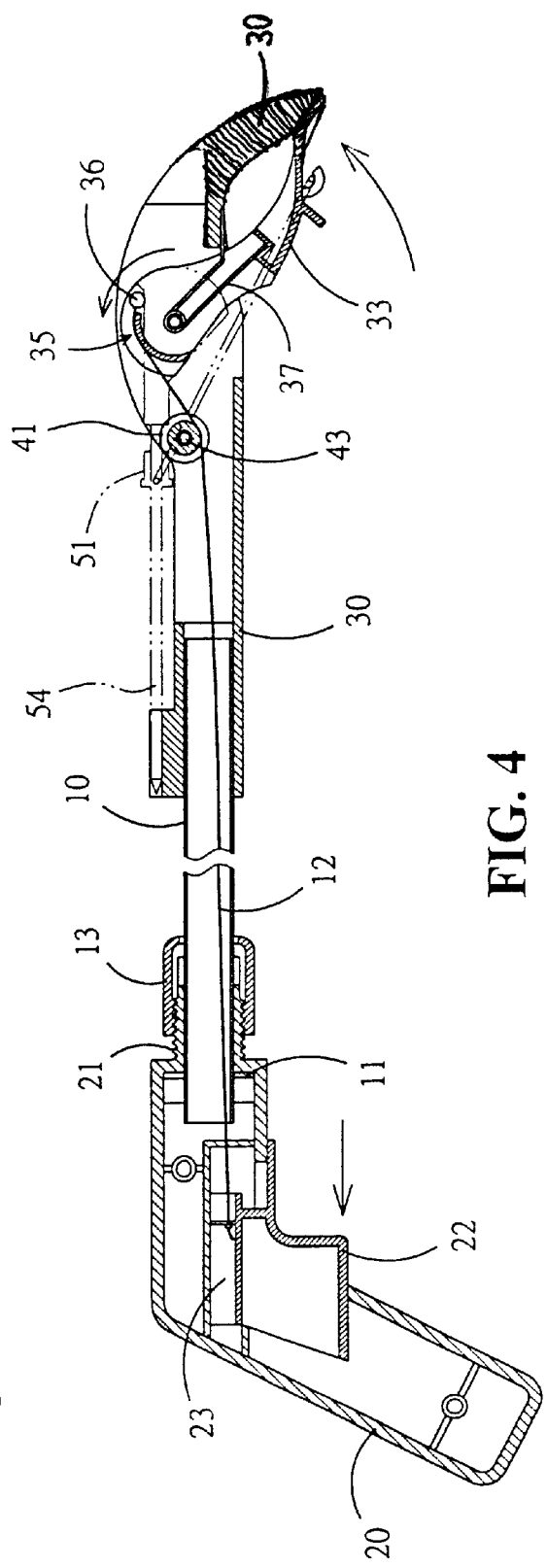
FIG. 4 is a sectional view illustrating how the present invention works.

As shown in FIGS. 3 and 4, when in use, a user may use his or her finger to depress the trigger 22 to pull the cable 12 to drive the movable jaw 33 to move toward the stationary jaw 30 thereby achieving the purpose of picking up garbage. When the trigger 22 is released, the spring 37 will push the movable jaw 33 back to its original position and the link 50 will push the slider 51 to move along the needle rod 54.

Figure 5:
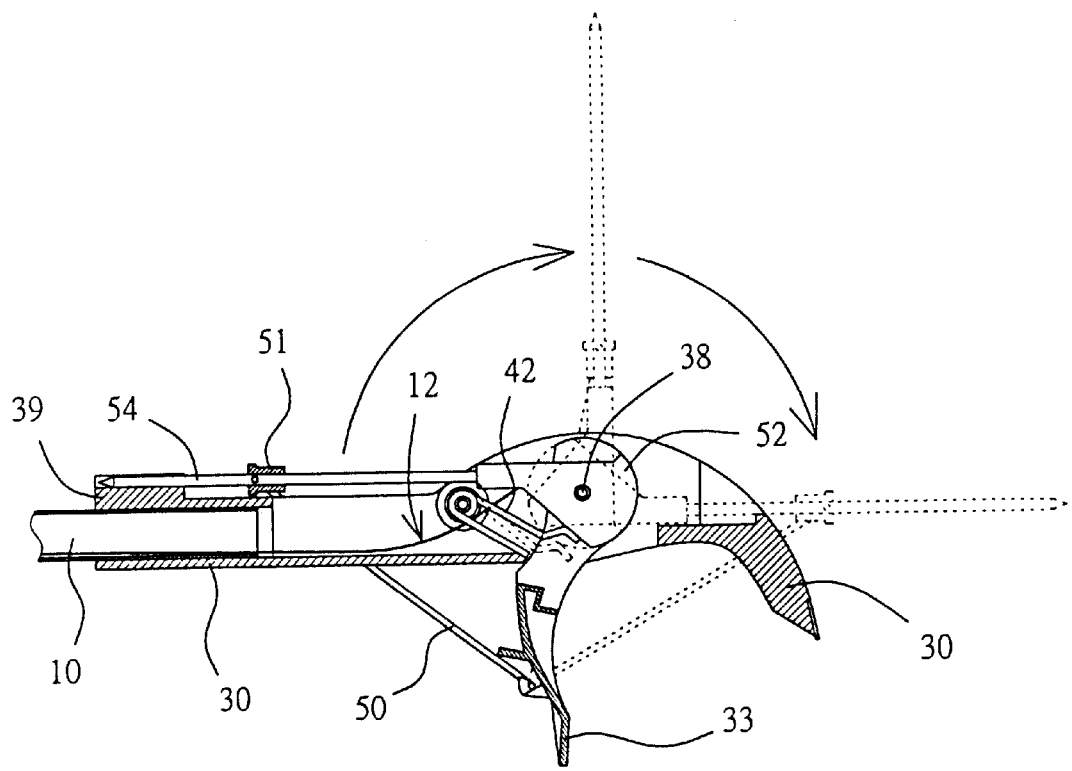
FIGS. 5 and 6 illustrate how the needle rod is arranged at two different positions.
Figure 6:
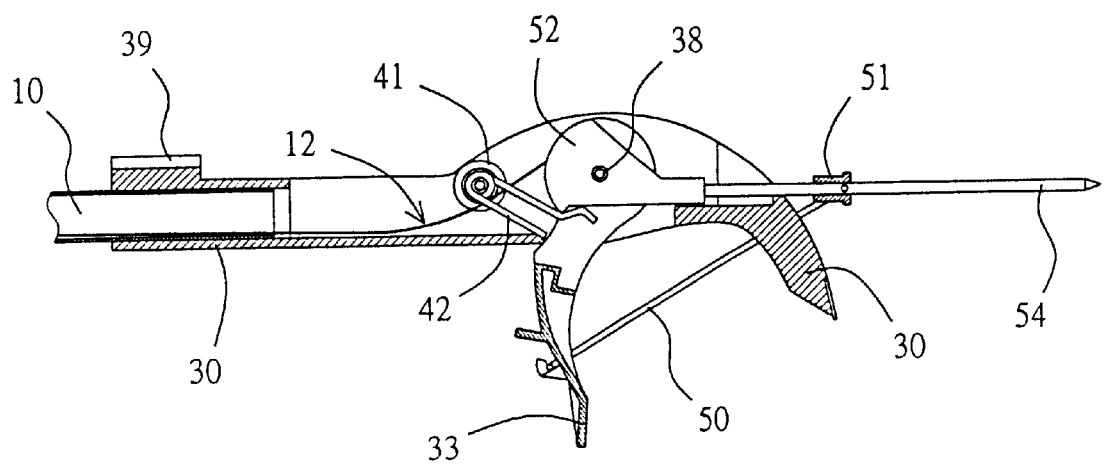
Figure 7:
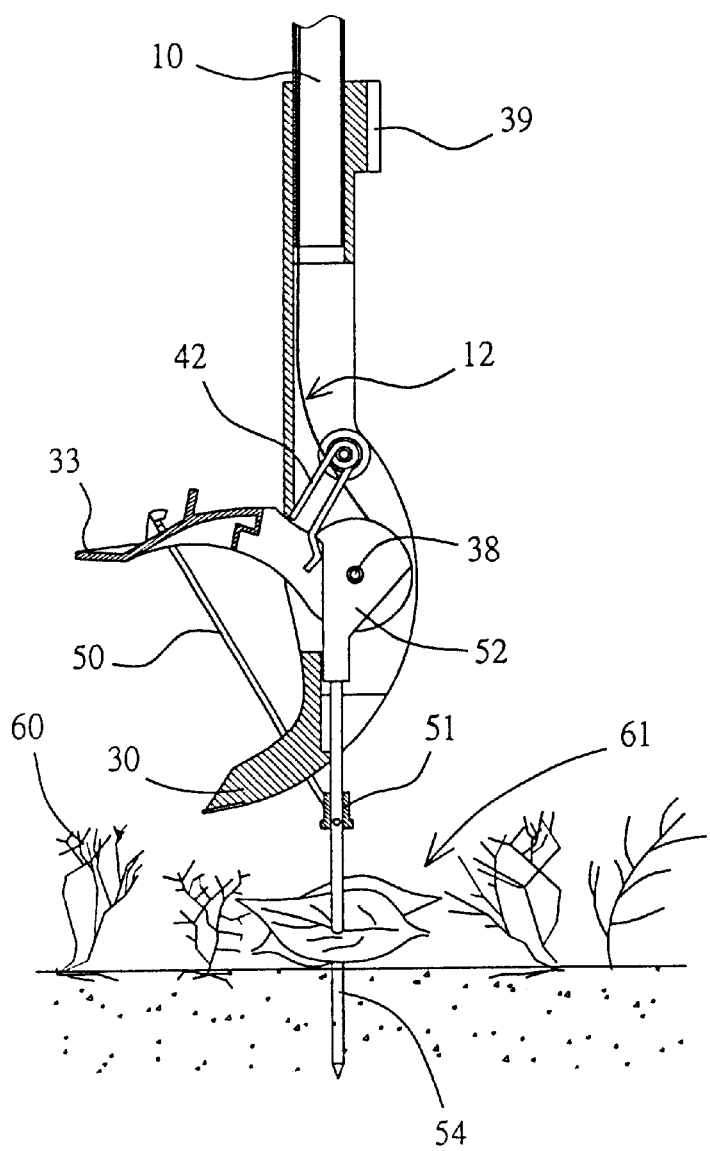
FIG. 7 illustrates how to use the needle rod to collect garbage by piercing.
Figure 8:
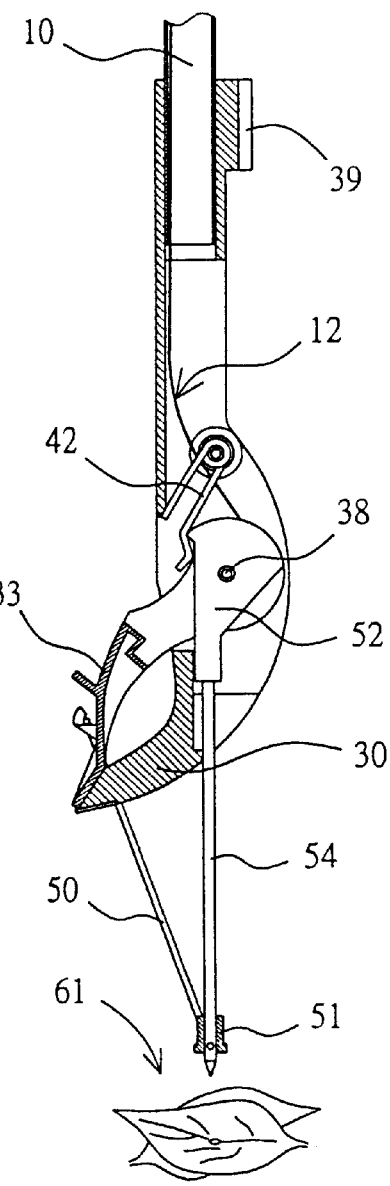
FIG. 8 illustrates how to remove garbage from the needle rod.

The needle rod 54 may be turned to the position as shown in FIGS. 5 and 6 so that the present invention can be used for piercing through leaves 61 (and the like) on grass or plant beds 60 (see FIG. 7). Then, the user may depress the trigger 22 of the handle 20 to move the slider 50 towards the tip of the needle rod 54 thereby pushing the leaves 61 out of the needle rod 54 (see FIG. 8).

Figure 9:
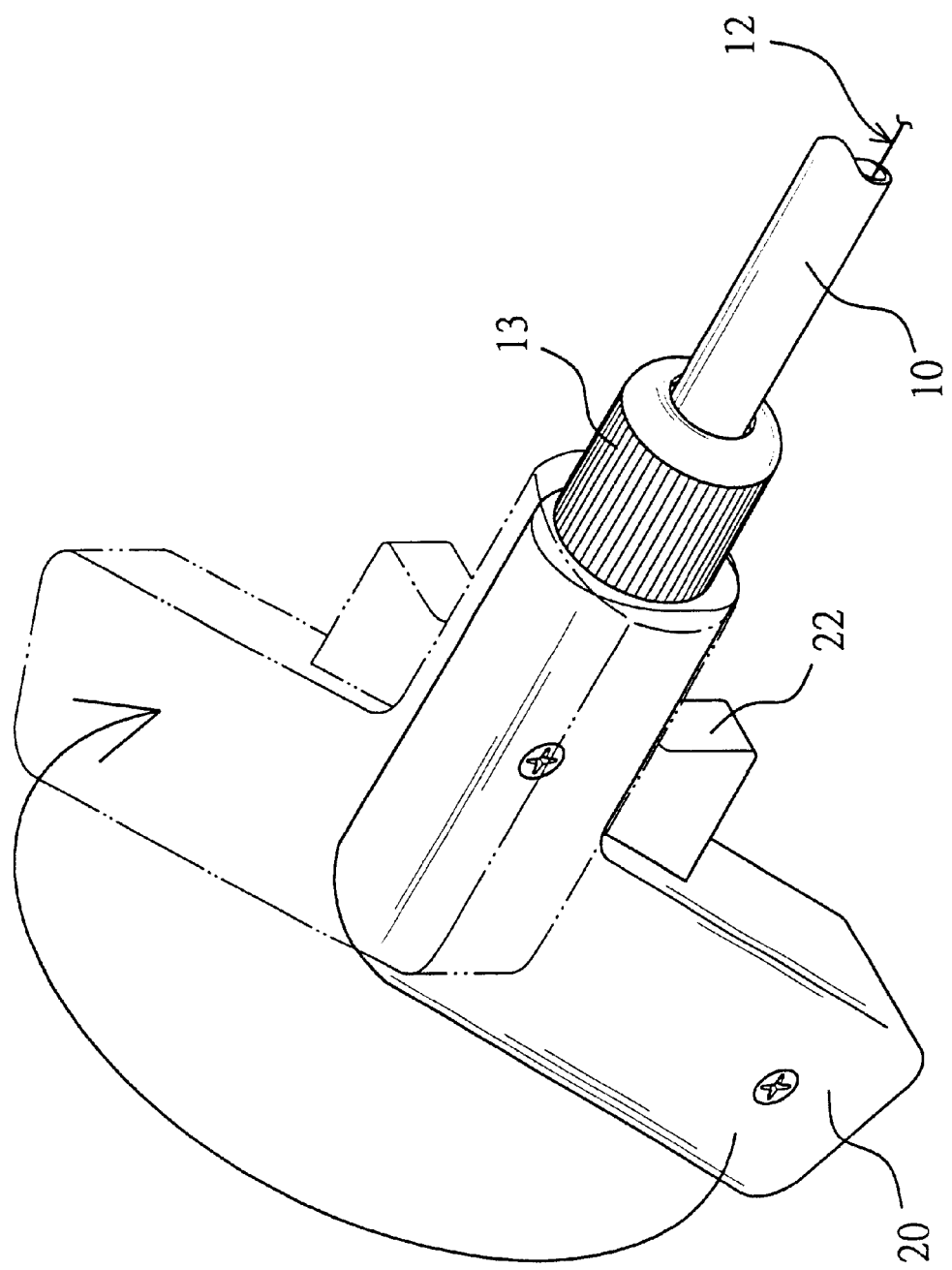
FIG. 9 illustrates how to adjust the position of the handle.

As shown in FIG. 9, the angular position of the handle 20 with respect to the clamping device can be adjusted by loosening the collar 13 thereby further facilitating the operation of the present invention.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A garbage pickup tool comprising:

a handle having a threaded tubular neck and a circular groove on an inner wall of said handle;

a C-shaped retainer ring fitted within said circular groove;

a tubular shaft having an end inserted into said handle through said threaded tubular neck and engaged with said C-shaped retainer ring;

a cable having two ends provided with two nipples;

a trigger mounted within said handle and having a longitudinal groove in which is fitted a stop member having a notch engaged with one of said nipples of said cable;

a collar threadedly engaged with said threaded tubular neck of said handle;

a stationary jaw fixedly mounted on another end of said tubular shaft and having an intermediate portion formed with a recess, two opposite lateral side walls of said intermediate portion being each formed with two through holes in communication with said recess;

a movable jaw having an end fitted within said recess by two pins extending through said through holes of said stationary jaw to keep said movable jaw, a sleeve, and two springs within said recess, said movable jaw being formed at the top with a groove for receiving said cable and having a positioning hole for receiving another one of said nipples of said cable, a top of said movable jaw being formed with a second groove in which is fitted a head having a groove, said head being pivotally connected with said movable jaw by one of said pins;

a needle rod extending from an end of said head and being able to be kept at two different positions by a spring; and a link having an end pivotally connected with said movable jaw and another end pivotally connected with a slider which is sleeved over said needle rod.

* * * * *